United States Patent [19]

Palmquist

[11] Patent Number: 4,738,507

[45] Date of Patent: Apr. 19, 1988

[54] OPTICAL FIBER CONNECTORS AND METHODS OF MAKING

[75] Inventor: John M. Palmquist, Lilburn, Ga.

[73] Assignee: American Telephone and Telegraph Company, AT&T Technologies, Inc., Berkeley Heights, N.J.

[21] Appl. No.: 739,800

[22] Filed: May 31, 1985

[51] Int. Cl.[4] .............................................. G02B 6/38
[52] U.S. Cl. ............................. 350/96.21; 350/96.20; 350/320
[58] Field of Search .............. 350/96.20, 96.21, 96.22, 350/320; 356/73.1

[56] References Cited

U.S. PATENT DOCUMENTS

| | | | |
|---|---|---|---|
| 3,938,895 | 2/1976 | Bridger et al. | 350/96.20 X |
| 4,057,322 | 11/1977 | Kao | 350/96.29 |
| 4,113,346 | 9/1978 | Jackson et al. | 350/96.20 |
| 4,193,664 | 3/1980 | Ellwood | 350/96.21 |
| 4,203,650 | 5/1980 | Millet et al. | 350/96.21 |
| 4,215,937 | 8/1980 | Borsuk | 356/73.1 |
| 4,240,695 | 12/1980 | Evans | 350/96.21 |
| 4,265,511 | 5/1981 | Nicia et al. | 350/96.20 X |
| 4,289,374 | 9/1981 | Franken et al. | 350/96.20 |
| 4,300,815 | 11/1981 | Malsot et al. | 350/96.20 |
| 4,353,620 | 10/1982 | Schultz | 350/96.21 |
| 4,458,985 | 7/1984 | Balliett et al. | 350/96.21 |
| 4,506,947 | 3/1985 | Tatekura et al. | 350/96.21 |
| 4,545,644 | 10/1985 | DeVeau, Jr. et al. | 350/96.21 |

OTHER PUBLICATIONS

Publications: Y. Kawamura et al "Optical Connectors for Singlemode Fibers", Lasers and Applications, Sep. 1984, beginning at p. 57.

*Primary Examiner*—John Lee
*Attorney, Agent, or Firm*—Edward W. Somers

[57] ABSTRACT

In order to connect two optical fibers (26—26), each of two plugs (40—40) each having a passageway (41) in which is received an optical fiber are mounted in a connector body (42). The plugs are destined to be received in a sleeve (75) of a coupler (60) such that their longitudinal axes are coaxial. Alignment of the passageways, at least radially of the longitudinal axes, is accomplished by locating for each plug the intersection of a radial line which extends through the centroid of an opening of the passageway with the periphery of the plug. Each plug is mounted in its connector body such that the intersection is aligned radially with a pin extending from the connector body. The connector bodies are inserted into opposite ends of the coupler sleeve to cause each pin of each connector body to be received in a slot in the coupler. The slots are aligned so that when the connector bodies are inserted into the coupler, the plugs are caused to be inserted into the sleeve such that the centroids of the passageways, and of the optical fibers, are aligned, at least along a plane that originates at and extends radially from the longitudinal axes.

27 Claims, 4 Drawing Sheets

OPTICAL FIBER CONNECTORS AND METHODS OF MAKING

TECHNICAL FIELD

This invention relates to optical fiber connectors and methods of making the connectors. More particularly, this invention relates to methods of causing optical fiber receiving passageways in coaxial connecting plugs to be disposed in a common plane which extends radially from coaxial longitudinal axes of the plugs to cause optical fibers received therein to be aligned at least radially of the longitudinal axes.

BACKGROUND OF THE INVENTION

Considering the fact that optical fibers may have an outside diameter of 125 microns, the connection of two optical fibers such that their cores in the range of about 8 to 50 microns are aligned is a formidable task. Several connectors are available commercially for establishing a connection between optical fibers.

One connector is referred to as a biconic connector. It includes facilites for holding two plugs each of which terminates an optical fiber and each of which has a conically shaped end portion. The optical fiber end terminates in a pedestal which extends beyond an end face of the plug. Two plugs are received in opposite ends of a sleeve which is mounted in a housing. The sleeve includes opposed, conically shaped cavities for receiving the plugs and for holding them in a manner to cause the end faces of the optical fibers to touch or to be spaced apart slightly. The plugs and the sleeves, which are molded, are controlled such that their mating surfaces cause the optical fibers to become aligned when the plugs are received in the sleeve. In this connector, the plugs are free to be turned about their longitudinal axes. Generally, facilities are not provided for repeated alignment of the plugs with respect to the sleeve.

Another connector is referred to as a ferrule type connector. It includes a coupler having a plug-receiving tubular portion at each end thereof. Each tubular portion is provided with a slot which extends longitudinally therealong. A sleeve which floats within the coupler is adapted to receive coaxially two plugs each of which is adapted to terminate an optical fiber. Each plug has a passageway extending longitudinally therethrough for receiving an optical fiber and is mounted in a connector body having an alignment pin projecting radially therefrom. When the connector body is received in a tubular portion of the coupler, the alignment pin is received in the slot which extends along the tubular portion. An assembly pin which projects radially from each tubular portion of the coupler is received in a slot of a housing which encloses the associated plug and connector body and which encloses a tubular portion of the coupler when the plug is assembled to the coupler. The slot in the housing includes a circumferential portion in which the assembly pin of the coupler is received to lock the plug to the coupler.

The ferrule type connector is advantageous in that the plugs are made of a ceramic material and are not molded. As a result, the plugs may be machined with close tolerances which is advantageous when dealing with optical fibers having relatively small dimensions. Further, the passageways in the plugs that are destined to receive the optical fibers are made cleanly without the molding flash which may be expected in other kinds of connectors and which could damage the optical fibers.

Although the floating sleeve in the coupler of the ferrule type connector assures that the outer surfaces of the plugs are aligned, it does not insure that the passageways in the plugs are aligned. Of course, if the passageways are not aligned, the optical fibers which are received in the passageways are not aligned and transmission losses ensue.

The prior art includes a connector system having a positioning tab which assures the same radial alignment of the ends of the optical fibers after repeated couplings. This insures that the fiber ends after disconnecting and reconnecting are always coupled together with the same orientation as before disconnection, but it does not provide for optimal alignment of the optical fibers in the first instance. Of course, optimal alignment may be achieved by a trial and error process which involves testing for each iteration of the process.

What is needed and what is not provided by the prior art is a ferrule type system for connecting optical fibers in which provisions are made for causing the optical fibers to be aligned optimally. A solution to the problem should be one which is relatively inexpensive to carry out, and should be one which is compatible with the presently available ferrule type connectors.

SUMMARY OF THE INVENTION

The foregoing problem has been overcome by the optical fiber connector of this invention and the methods of making same. A portion of a connector which is used to terminate an optical fiber includes a plug having a longitudinal axis and a longitudinally extending passageway. The passageway is adapted to receive an end portion of an optical fiber. A surface of the plug may be provided with a marking which is disposed along a line that originates at and extends radially from the longitudinal axis through the centroid of an opening of the passageway in an end face of the plug to cause the centroid of an end face of the optical fiber which is received in the passageway to be disposed along the radially extending line and thereby aligned with the marking. In this application, centroid of the passageway or of the opening of the passageway is defined as the center of mass of a thin, uniform plate having the same periphery as a transverse cross-section of the passageway of the plug and being adjacent to the plug end face. Centroid of the optical fiber is defined as the center of mass of a thin, uniform transverse slice of the optical fiber adjacent to an end face of the plug in which it is received.

An optical fiber connector of this invention includes two of the above-described plugs. A coupler is provided for causing the plugs to be supported with the longitudinal axes of the plugs being coaxial and with the radially extending lines of the plugs being disposed in a common plane which originates at and extends radially from the longitudinal axes to cause the centroids of the passageways and of optical fibers received in the passageways to be disposed substantially in the common plane. As a result, the cores of the optical fibers are aligned substantially. In a preferred embodiment, each plug is mounted in a connector body with the marking aligned with a pin of the connector body. In the alternative, the marking may be machined-recorded instead of being a physical one and a connector body is assembled to the plug with the pin thereof aligned with the marking in accordance with stored information. The connector bodies are received in a coupler with the longitudinal axes thereof being coaxial. The coupler includes facilites for holding the pins of the connector bodies so that the plug passageways are disposed in a common plane which originates at and which extends radially from the longitudinal axis.

More specifically, a centroid of an opening to a longitudinally extending passageway in a first plug and to one in a second plug each are located in a plane which is transverse to a longitudinal axis of each plug. Each of the passageways is adapted to receive an optical fiber. Then each plug is caused to be rotated about its longitudinal axis through an angle of 180°. The centroid of the opening to the passageway in each plug again is located. Using the centroids of the passageways in the original and in the rotated positions, the longitudinal axis of each plug is located. Then, for each plug, there is located the intersection of a radial line, which extends from the longitudinal axis, and the periphery of the plug. The radial line of each plug intersects the location of the centroid of the rotated position of the passageway such that the centroid of the passageway in the rotated position is disposed between the intersection and the longitudinal axis of the plug. The first plug is assembled to a connector body and a housing such that the intersection is aligned with a pin extending from the connector body. The second plug is assembled in a similar fashion with a connector body and a housing. Afterwards, an end portion of an optical fiber is inserted into the passageway of the first plug and an end portion of another optical fiber is inserted into the passageway of the second plug. Then the plugs are mounted in a sleeve of a coupler such that the longitudinal axes of the plugs are coaxial and such that the pins of the connector bodies are aligned to cause the centroids of the passageways in the first and second plugs and end faces of the optical fibers to be disposed in a common plane which originates at and which extends radially from coaxial longitudinal axes of the plugs.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION

Figures 1, 1A, 2:
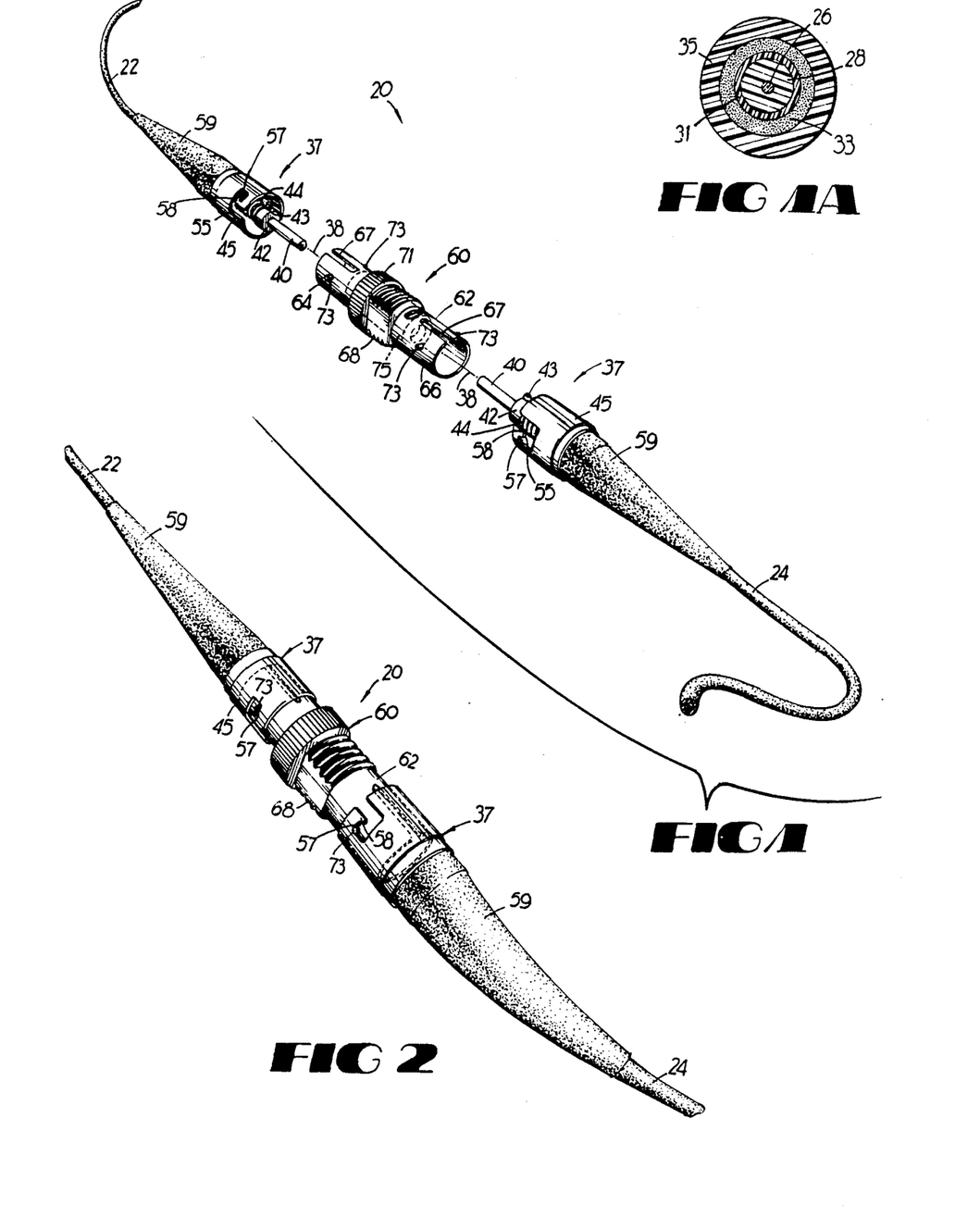
FIG. 1 is an exploded perspective view of an optical fiber connection arrangement.
FIG. 1A is an end cross-sectional view of one of two optical fiber cables which are connected by methods and devices of this invention.
FIG. 2 is a perspective view of the optical fiber connection arrangement of FIG. 1 as assembled.

Referring now to FIGS. 1 and 2 there is shown an optical fiber connector 20 for providing an optical fiber connection between an optical fiber cable 22 and an optical fiber cable 24. Each of the optical fiber cables 22 and 24 includes a single optical fiber 26 (see FIG. 1A) enclosed in a coating 28 and having a tube 31 of polyvinyl chloride (PVC) extruded thereabout. Covering the tube 31 of PVC is a strength member 33 such as one made of Kevlar ® fibrous material, for example, and an outer jacket 35 which may be comprised of PVC.

Referring to FIGS. 1-4, it can be seen that the connector 20 comprises two fiber terminations, each designated generally by the numeral 37. Corresponding elements of the terminations 37—37 are identified with the same numerals. The connector 20 is such that longitudinal axes 38—38 of the terminations are coaxial. Each termination 37 comprises an optical fiber terminus or plug 40, having a passageway 41 (see FIG. 4) and being made of a ceramic material. An end face 39 of the plug 40 includes an opening of the passageway 41. Each termination also includes a connector body 42 made of a plastic or metallic material, a compression spring 44 and a tubular housing 45 made of a metallic material. The plug 40 has an outer diameter of about 2500 microns. It should be observed that the plug 40, the connector body 42 and the housing 45 each have a cylindrical cross-section. The connector body 42 includes an alignment pin 43 which projects radially from the longitudinal axis 38. The coating 28, as well as the tube 31, strength member 33 and outer jacket 35, is removed from the optical fiber 26 prior to its assembly with a plug 40. The bared optical fiber has an outer diameter of 125 microns which corresponds substantially to the diameter of the passageway 41.

The connector body 42 includes a smaller diameter portion 46 (see FIG. 3) which extends through an opening 47 in an internally disposed collar 48 in the housing. A retaining washer 49 circumscribes the smaller diameter portion on the outer side of the collar. The spring 44 is disposed about the smaller diameter portion 46 of the connector body 42 between the collar and a large diameter portion 51. As a result of this arrangement, the spring 44 biases the connector body 42 outwardly from the cable to hold the connector body within the housing 45.

Viewing again FIG. 1, it can be seen that the housing 45 includes a longitudinally extending slot 55 which at its inner end communicates with a circumferentially extending slot 57. The slot 57 is formed so that the tubular wall of the housing which defines it includes a latching projection 58. These slots 55 and 57 are used for securing a termination 37 to another portion of the connector 20.

Completing the connector termination 37, there is shown a portion 59 which extends from the housing 45 along the optical fiber cable in a conically shaped configuration until it assumes the general cross-section of the cable. This portion of the connector 20 provides strain relief and insures that the cable can withstand repeated bends in use after interconnection with another cable without undue stresses being imparted to the optical fibers.

Each of the connector bodies 42—42 and termini or plugs 40—40 is adapted to be received in a coupler designated generally by the numeral 60. The coupler 60 includes a tubular member 62 having end portions 64 and 66 with each end portion including a longitudinally extending slot 67. In order to allow the connector 20 to be panel-mountable, the coupler 60 includes a center portion 68 which is threaded and which is adapted to be inserted in a hole (not shown) in a panel. A nut 71 is turned thereonto to secure the coupler to the panel. Also included in the coupler 60 at each end portion 64 and 66 thereof are assembly pins 73—73 which are displaced circumferentially from the slot 67 at that end.

Figure 3:
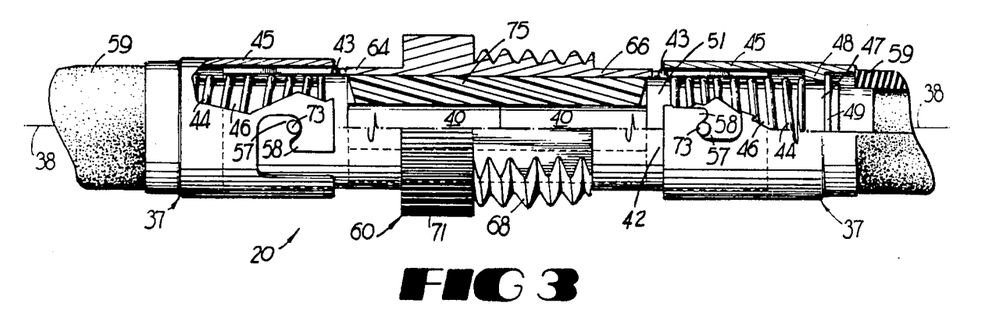
FIG. 3 is an elevational view partially in section of the connection arrangement of FIG. 2.
Figure 4:
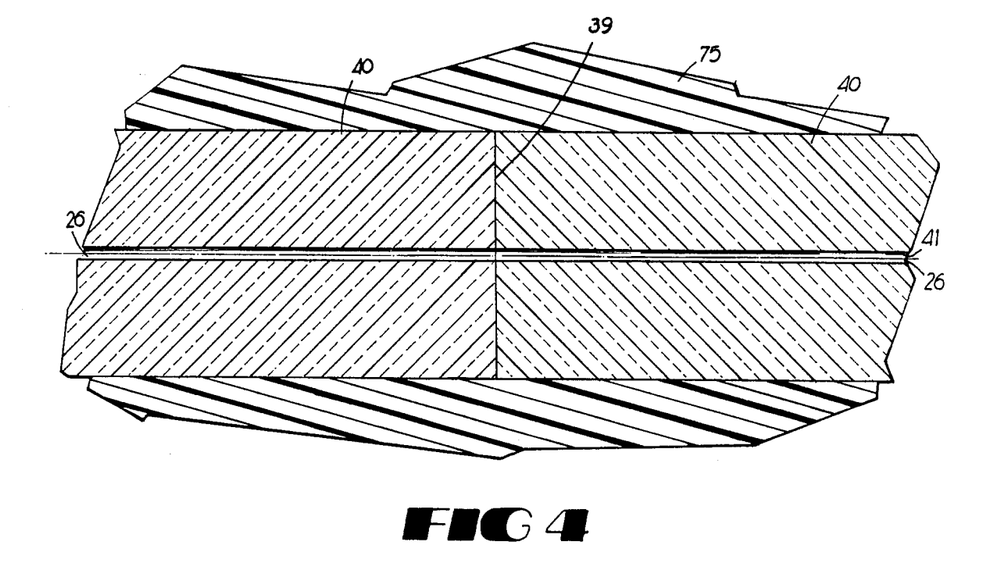
FIG. 4 is an enlarged elevational view of two plugs of the connection arrangement of FIG. 3.

In assembling the connector 20 which is shown in FIGS. 1 and 3, an installer panel-mounts the coupler 60 or otherwise positions it to receive the terminations 37—37. Mounted within the coupler 60 is a sleeve designated generally by the numeral 75. The sleeve 75 is adapted to receive the plugs 40—40 of the terminations 37—37 and is a means for aligning the outer surfaces of the plugs. The sleeve 75 is disposed within the coupler 60 such that it floats to allow for some movement of the plugs 40—40 when they are inserted into the coupler. Further, the sleeve 75 causes the longitudinal axes 38—38 of the plugs 40—40 mounted therein to be coaxial.

The installer, in assembling the connector 20, inserts the plug 40 of one of the terminations 37—37 into the sleeve 75 with the pin 73 of the coupler being received in the longitudinally extending slot 55 of the termination. At the same time, the installer has caused the pin 43 which extends radially from the connector body 42 of the one termination 37 to be received in a longitudinal slot 67 of the coupler 60. The movement of the plug 40 is discontinued when the pin 43 engages an inner end of the wall which defines the slot 67. Continued movement of the housing 45 against the bias of the spring 44 causes the housing to override the connector body. When the pin 73 at the one end of the coupler 60 reaches an inner end of the longitudinally extending slot 55, the operator turns the housing 45 to cause the pin 73 to become disposed and secured within the circumferentially extending slot 57 behind the latching portion 58 (see FIG. 3). It should be observed that the plug 40 and its associated connector body 42 are free to turn in the housing 45. This allows the housing 45 to be turned independently of the connector body 42 to cause the pin 73 to become disposed behind the latching portion 58.

After these steps, the installer repeats the procedure with respect to the other termination 37 to cause the plug 40 thereof to be received within the floating sleeve 75. It should be observed that because of dual pins at each end of the coupler 60, either end may be inserted into a panel. The geometries of the coupler 60 and of the terminations 37—37 are such that when the plugs 40—40 are received within the floating sleeve 75, and the pins 43—43 bottomed out in the slots 67—67 of the coupler 60, end faces of the plugs 40—40 abut each other (see FIGS. 3 and 4). As a result, transmission losses through the connector 20 are minimized.

Figures 5, 6:
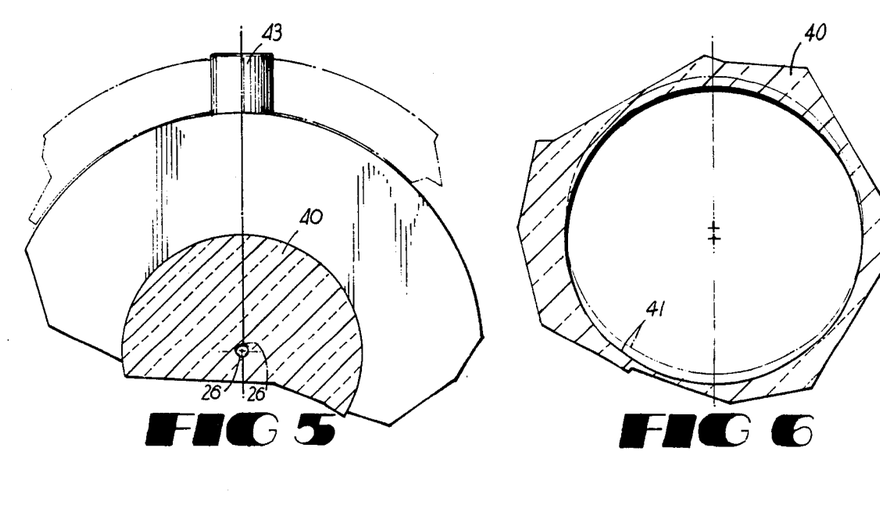
FIG. 5 is an end view in section of a portion of the connection arrangement of FIG. 3.
FIG. 6 is an end view of passageways of the two plugs of FIG. 4.

In order to insure that the transmission losses are further minimized, it is encumbent upon the manufacturer of the connector 20 to insure that the cores of the optical fibers 26—26 which are destined to be secured within the passageways 41—41 of the plugs 40—40 are aligned optimally as a result of the connection process. This is accomplished by the methods and devices of this invention which rely on a predetermined orientation of the optical fibers 26—26 with respect to the pins 43—43 extending from the connector bodies 42—42. More specfically, the methods of this invention include the location and machine vision marking or other suitable marking of the radial orientation of the passageways 41—41 which extend through the plugs 40—40 with respect to a longitudinal axis of the connector and their alignment in a particular manner to insure that the optical fibers 26—26 received therein are aligned at least radially (see FIG. 5). Such a technique results in the passageways being offset no more than 3 microns. An enlarged view of how the passageways 41—41 may overlap while being aligned in a radial direction is shown in FIG. 6.

Figure 7:
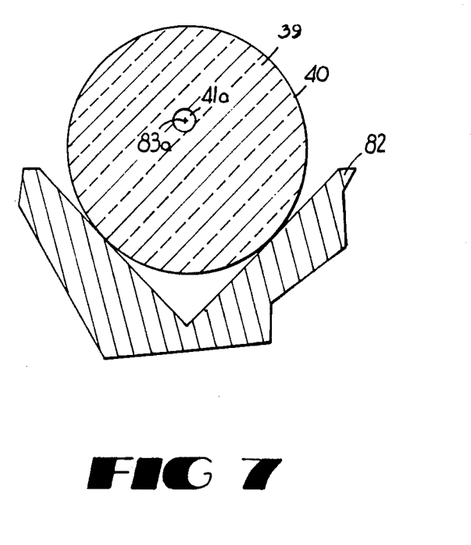
FIGS. 7-10 are a sequence of views to illustrate steps of the inventive method for causing alignment of passageways which extend through the plugs with distances from longitudinal axes of the plugs to centroids of the passageways being exaggerated for purposes of clarity.
Figure 8:
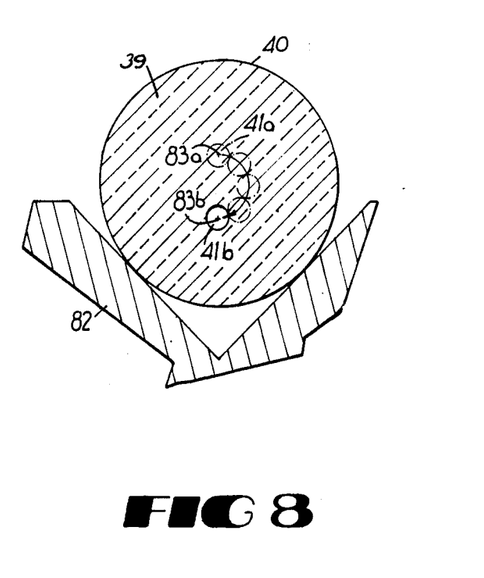
Figure 9:
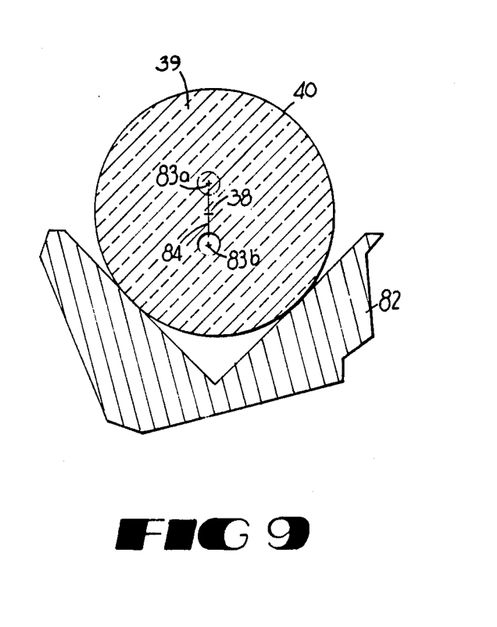

In a first step of the process, each plug 40 is caused to be disposed within a V-shaped support trough 82 (see FIG. 7), for example, and appropriate facilities used in order to locate centroid 83a of the opening to the passageway 41 in the end face 39 of the plug. Apparatus (not shown) such as well-known machine vision apparatus is used to record the location 83a adjacent to the end face of the plug 40 at an initial location 41a of the passageway 41.

It should be understood that although the passageways and the plugs in FIGS. 7-15 are approximately to relative scale, the displacement of the passageways with respect to the longitudinal axis of the plug is not. It will be recalled that the diameter of the plug is about 2500 microns, and the diameter of the passageway is about 125 microns. Also, the maximum distance by which the centroid of the passageway is offset from the longitudinal axis 38 in a production plug 40 is 3 microns. The displacement, which is more accurately depicted in FIG. 6, is exaggerated in FIGS. 7-15 in order to more clearly depict the alignment steps of this invention.

Then the plug 40 within the support 82 is caused to be turned through an angle of 180° (see FIG. 8) to locate again the centroid of the passageway 41 extending therethrough. In the rotated position, the centroid of the passageway is designated 83b. The location 83b adjacent to the end face of the plug 40 and aligned with the location 41b of the passageway 41 after rotation is recorded. It should be understood that although the passageway locations in FIGS. 7-10 and in ensuing figures are depicted along a vertical axis, they may be at any radial position about an end face of the plug 40. Next, a line 84 (see FIG. 9) is caused to be extended between the centroid of the initial position 41a of the passageway 41 as the plug 40 is supported within the trough 82 and the centroid of the final location 41b of the passageway. A center of the end face of the plug 40 is determined between the centroids of the passageway locations 41a and 41b. Then, a radial line 88 (see FIG. 10) is extended from the center, through which extends the longitudinal axis 38 of the plug 40, to intersect the periphery of the plug 40 at a location designated 90. The intersection 90 is in radial alignment with the second location of the passageway 41 of the plug.

Figure 10:
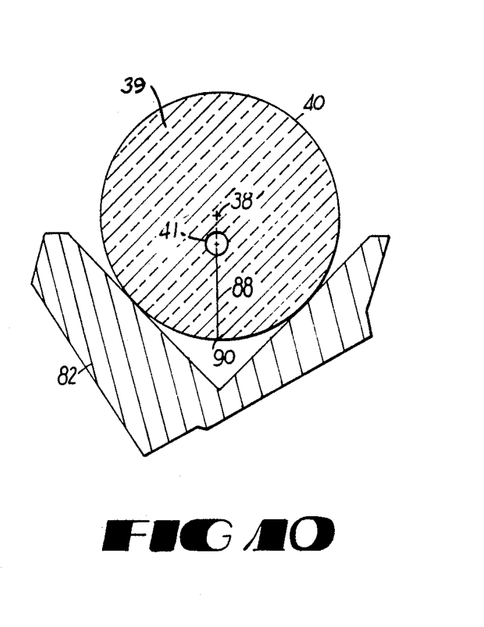

The intersection 90 may take several forms. It may comprise an inked mark or it may simply be a reference point which provides an indication of an angle by which the radial line 88 is displaced from a reference coordinate axes of the end face of the plug 40.

In the preferred embodiment, the intersection 90 adjacent to the periphery of the plug 40 is made such that the passageway 41 always is positioned in a particular way relative to the intersection and the longitudinal axis 38 of the plug. The passageway 41 is disposed either at the longitudinal axis 38 of the plug 41 or between the longitudinal axis 38 and the intersection 90 adjacent to the periphery thereof.

Then the plug 40 is assembled with and secured to a connector body 42 such that the intersection 90 on the periphery of the plug is aligned with the pin 43 of the connector body. Subsequently, a housing 45 is assembled to the connector body 42. This procedure is performed with respect to the plug 40 after which the optical fiber 26 is assembled thereto and caused to be secured within the plug by well known techniques. Afterwards, excess length of the optical fiber 26 which extends beyond the plug 40 is severed and the newly created end face ground and polished.

This procedure is repeated for each termination 37. As a result, each termination 37 includes a terminated optical fiber 26 received in a passageway 41 which is aligned with a pin 43 extending radially from the connector body 42 thereof. It should be noted that all terminations 37—37 are assembled in exactly the same way thereby rendering them interchangeable for mounting in the coupler 60.

As a result of the foregoing steps, it can be seen that each of the plugs 40—40 terminates an optical fiber 26 which is aligned radially with the pin 43 of the connector body 42 in which the plug is received. As will be recalled, the pin 43 of each termination 37 is received in one of the slots 67—67 when the termination is assembled to the coupler 60. The plugs 40—40 are inserted into the sleeve 75 such that the end faces 39—39, in which the centroids of the passageway openings have been determined, are adjacent to each other. As a result, the passageways 41—41 and optical fibers 26—26 of plugs 40—40 which are assembled to a coupler 60 are always aligned in a plane which originates at the coaxial longitudinal axes 38—38 and which extends radially thereof through the slots 67—67 which themselves are aligned.

Figure 11A:
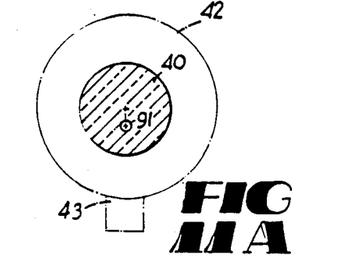
FIGS. 11A-11C are a sequence of views which show a prior art method of aligning passageways of two plugs with distances from longitudinal axes of plugs to centroids of the passageways being exaggerated for purposes of clarity.
Figure 11B:
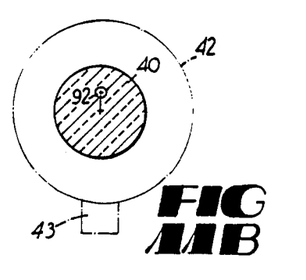
Figure 11C:
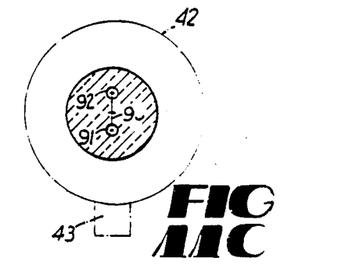

The methods of this invention reduce the distance by which the centroids of the passageway openings are offset from each other with prior art techniques. Referring now to FIG. 11, it can be seen that without the methods of this invention it is possible to have the centroid of one passageway 91 (see FIG. 11A) in one plug 40 and that of a passageway 92 (see FIG. 11B) in another plug along oppositely extending radii. It should be appreciated that the connector bodies 42—42 and pins 43—43 are shown in phantom in FIGS. 11-15 to relate the orientation of the passageways thereto. It has been determined that the centroid of each passageway in a production plug might lie as much as perhaps 3 microns from the longitudinal axis of its associated plug. Although the passageways in FIG. 11 are disposed along a diametrical line 93, they are on diametrically opposite sides of a longidutinal axis of the plugs 40—40 and may have their centroids spaced apart as much as 6 microns when the plugs are assembled in a sleeve 75 (see FIG. 11C).

Advantageously, with the methods of this invention, the offset distance by which the passageway centroids are separated is minimized. Applying the methods of this invention, it can be seen from FIG. 12 that centroids of passageways are caused to be disposed in a common radial plane and on the same side of the longitudinal axes. Centroid 94 of a passageway 96 (see FIG. 12A) of one plug 40 is caused to be aligned with a pin 43 and disposed between the pin and the longitudinal axis 38 of the plug. Similarly, the centroid 95 of a passageway 97 (see FIG. 12B) of another plug is caused to be aligned with a pin 43 and disposed between the pin and the longitudinal axis of that plug. Then the connector bodies 42—42 are assembled to the sleeve within the coupler 60 in a way to cause the pins 43—43 to be aligned in a common radial plane which originates at and extends from the coaxial longitudinal axes 38—38. As a result, in many instances, the passageways, although offset from the longitudinal axes, are not only disposed in a common plane but are aligned substantially longitudinally (see FIG. 12C). Inasmuch as it has been determined that the offset of the centroid of a passageway 41 from the longitudinal axis of a plug 40 does not exceed 3 microns, this technique reduces the offset of passageways of plugs mounted in a sleeve 75 to a distance not greater than 3 microns.

Figure 12A:
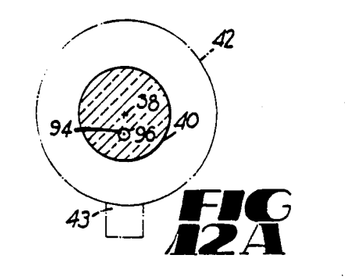
FIGS. 12A-12C and FIGS. 13A-13C show the alignment of plug passageways in accordance with this invention with distances from longitudinal axes of plugs to centroids of the passageways being exaggerated for purposes of clarity.
Figure 12B:
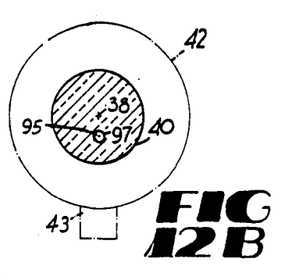
Figure 12C:
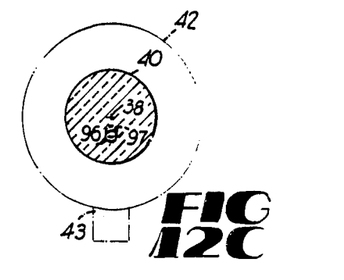
Figure 13A:
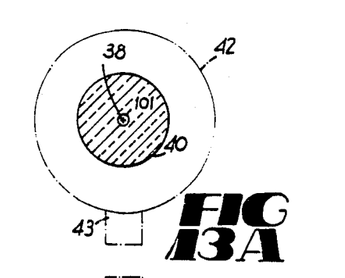
Figure 13B:
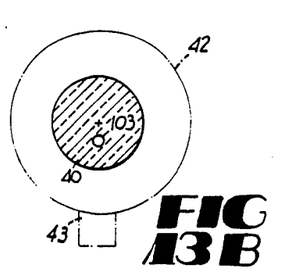
Figure 13C:
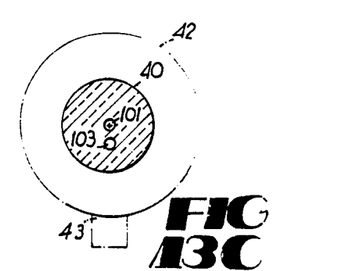

As shown in FIG. 13, the centroid of one passageway 101 may be coincident with the longitudinal axis 38 of the plug 40, and another 103, disposed between the longitudinal axis 38 of its plug and the plug periphery. Otherwise, the centroids of the passageways of both plugs are disposed between the longitudinal axes 38—38 and the peripheries of the plugs as shown in FIG. 12C.

Figure 14A:
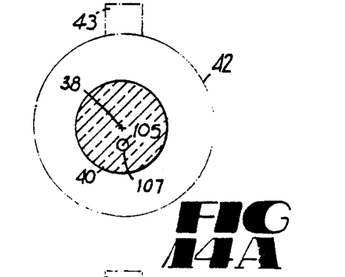
FIGS. 14A-14C and FIGS. 15A-15C illustrate alternative embodiments of the invention with distances from longitudinal axes of plugs to centroids of the passageways being exaggerated for purposes of clarity.
Figure 14B:
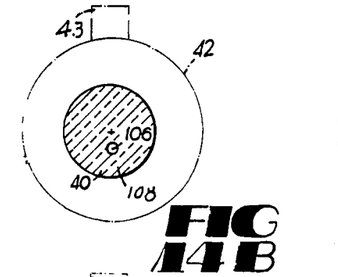
Figure 14C:
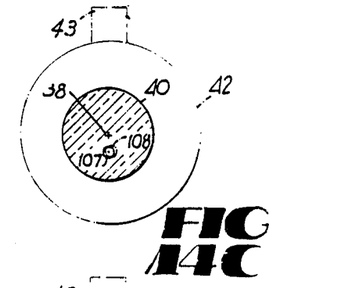

Although the preferred embodiment has been described always to have the centroids of the plug passageways coincident with the longitudinal axes 38—38 of the plugs 40—40 or disposed between the longitudinal axes and the pins 43—43 of the connector bodies 42—42, this is not necessary. For example, as shown in FIG. 14, the orienting process is carried out to cause the longitudinal axes 38—38 of the plugs 40—40 to be disposed between the associated pins 43—43 and centroids 105 and 106 of passageways 107 and 108. As in the preferred embodiment, all plugs 40—40 are oriented in the same manner and assembled with a connector body in the same way.

Figure 15A:
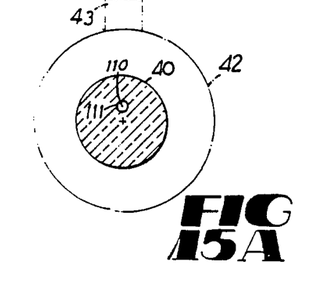
Figure 15B:
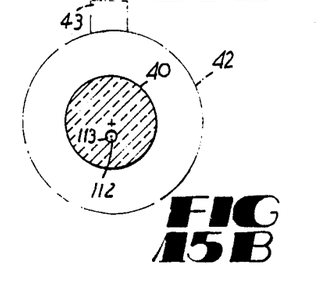
Figure 15C:
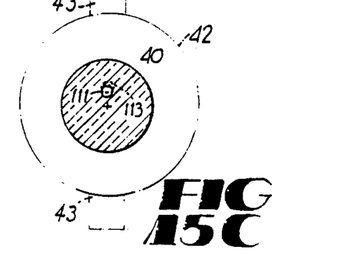

It is also possible to use the approach shown in FIG. 15. Therein, one plug 40 is marked such that the centroid 110 of a passageway 111 (see FIG. 15A) is disposed between the associated pin 43 of the connector body 42 and the longitudinal axis 38 of the plug. The other plug 40 is marked to cause the longitudinal axis 38 to be disposed between the centroid 112 of a passageway 113 (see FIG. 15B) and the pin 43. To connect the two plugs, the plug of FIG. 15A is assembled to align the pin 43 of a connector body with the passageway in the position shown. However, the second plug is rotated 180° so that the pin 43 of its connector body is diametrically opposite to that of the first plug to cause the passageway centroids to be on the same side of the longitudinal axis (see FIG. 15C). However, with this method, all plugs are not marked or assembled with connector bodies 42—42 in the same way. Some are assembled as shown in FIG. 15A and same as in FIG. 15B.

As will be recalled, the optical fibers 26—26 which are secured within the plugs 40—40 have had their coatings removed prior to the assembly therewith.

Each of the optical fibers 26—26 has an outer diameter of about 125 microns. As a result of the above-mentioned procedure, it has been determined that the worst possible match-up would be the one shown in FIG. 13 wherein one of the plugs 40—40 has a passageway having its centroid coincident with the longitudinal axis 38 of the plug and with the other plug having its passageway centroid between its longitudinal axis 38 and its outer periphery a distance of about 3 microns. Accordingly, in the worst possible case, these passageways would have their centroids misaligned along a common radial plane by a distance which does not exceed about 3 microns.

It should be understood that the above-described arrangements are simply illustrative of the invention. Other arrangements may be devised by those skilled in the art which will embody the principles of the invention and fall within the scope and spirit thereof.

What is claimed is:

1. An optical fiber connector, which includes:
   first and second plugs each having a longitudinal axis and a longitudinally extending passageway, each passageway being adapted to receive an end portion of an optical fiber and each plug having the location of the centroid of an opening to its passageway disposed along a line which extends radially from the longitudinal axis of the plug; and
   means for causing said first and second plugs to be supported with the longitudinal axes of the plugs being coaxial and with the radially extending lines of the plugs being disposed in a common plane which originates at and which extends radially from the longitudinal axes to cause the centroids of the passageways to be disposed substantially in the common plane.

2. An optical fiber connector, which includes:
   first and second plugs each of which includes a longitudinal axis and passageway extending longitudinally therethrough and being adapted to receive an optical fiber;
   a first connector body in which is mounted said first plug, said first plug being mounted in said first connector body with the centroid of an opening to its passageway disposed along a radial line which extends from the longitudinal axis of said first plug in a predetermined orientation with respect to said first connector body;
   a second connector body in which is mounted said second plug, said second plug being mounted in said second connector body with the centroid of an opening to its passageway disposed along a radial line which extends from the longitudinal axis of said second plug in a predetermined orientation with respect to said second connector body; and
   a coupler in which said first and second connector bodies are adapted to be received with the longitudinal axes of the plugs being coaxial and including means for holding the first and second connector bodies to cause the centroids of the passageways of the first and second plugs to be disposed substantially along a common plane which originates at the longitudinal axes and which extends radially therefrom.

3. The connector of claim 2, wherein said coupler includes a sleeve and each of said plugs is adapted to be received in the sleeve.

4. The connector of claim 2, wherein each of said connector bodies is enclosed in a housing, each said housing including a longitudinally extending slot connected at its inner end to a circumferential slot and wherein said coupler includes a radially projecting assembly pin at each end thereof, each said pin of said coupler adapted to be received in a slot of a housing when the connector body enclosed by said housing is received in said coupler.

5. The connector of claim 2, wherein said holding means of said coupler includes a longitudinally extending slot at each end thereof with the slots being aligned longitudinally and wherein each of said connector bodies includes a radially projecting pin and the predetermined orientation is the alignment of the pin of each connector body with the radial line along which the centroid of the passageway of the plug assembled therewith is disposed, the pin of each said connector body adapted to be received in a slot of said coupler when said connector body is received in said coupler.

6. A device which is adapted to terminate an optical fiber, said device including:
   a plug having a longitudinal axis and a longitudinally extending passageway, said passageway adapted to receive an end portion of an optical fiber; and
   a marking which is provided on a surface of said plug and which has a predetermined orientation with respect to a plane that originates at and extends radially from the longitudinal axis through the centroid of an opening of the passageway in an end face of the plug to enhance the optical alignment of an end face of an optical fiber which is to be received in said passageway and terminated by said plug with the end face of another optical fiber which is received in the passageway and terminated by another said plug.

7. A terminated optical fiber cable, comprising:
   a termination comprising:
   a plug which includes a longitudinal axis and a longitudinally extending passageway; and
   a connector body in which is mounted said plug and including a pin extending radially from the longitudinal axis of said plug, said plug being mounted in said connector body to cause a centroid of an opening of the passageway in an end face of the plug to be aligned with said pin along a radial line which extends from the longitudinal axis of the plug through the centroid, said connector body adapted to be received in one end of a coupler and the connector body of another terminated optical fiber cable adapted to be received in the other end of said coupler such that the longitudinal axes of the plugs are coaxial and the pins of the connector bodies disposed in a common plane which extends radially from coaxial longitudinal axes of said plugs; and
   an optical fiber cable comprising an optical fiber, an end portion of which is disposed in the passageway of said plug.

8. An optical fiber interconnection cable system, which comprises:
   first and second terminated optical fiber cables each of which includes:
   an optical fiber cable which includes an optical fiber and a sheath system which encloses said optical fiber, an end portion of said cable having said sheath system removed therefrom;
   a plug which includes a longitudinal axis and a longitudinally extending passageway with an end portion of said optical fiber being disposed in said passageway; and a connector body in which is mounted said plug and including a pin extending radially from the longitudinal axis of said plug, said plug being mounted in said connector body to cause the centroid of an opening of the passageway in an end face of the plug to be aligned with said pin along a radial line which extends from the longitudinal axis of the plug; and a coupler including a tubular member adapted to receive a connector body in each end thereof and a sleeve disposed within said tubular member and adapated to receive a plug in each end thereof such that the longitudinal axes of the plugs are coaxial, said tubular member including a longitudinally extending slot in each end thereof, sid slots being aligned and being adapted to receive said pins of said connector bodies when said plugs are moved into said sleeve to cause said passageways to be aligned radially.

9. An optical fiber connection, which includes:

first and second plugs each of which includes a longitudinal axis and a passageway extending longitudinally therethrough and being adapted to receive an optical fiber;

an optical fiber disposed in the passageway of the first plug and an optical fiber disposed in the passageway of the second plug with an end face of each optical fiber extending to an end face of its associated plug;

a first connector body in which is mounted said first plug with the centroid of an opening of its passageway in the end face of the first plug disposed along a line which extends radially from the longitudinal axis of said first plug in a predetermined orientation with respect to said first connector body;

a second connector body in which is mounted said second plug with the centroid of an opening of its passageway in the end face of the second plug disposed along a line which extends radially from the longitudinal axis of said second plug in a predetermined orientation with respect to said second connector body; and a coupler in which are received said first and second plugs with the longitudinal axes thereof being coaxial and with the end faces of the plugs being adjacent to each other, said coupler including means for holding the first and second plugs to cause the centroids of their passageways to be disposed in a common plane which originates at the longitudinal axes and which extends radially therefrom.

10. The connection of claim 9, wherein each of said plugs is received in a sleeve which is disposed in said coupler.

11. The connection of claim 9, wherein each of said connector bodies is enclosed in a housing, each said housing including a longitudinally extending slot connected at its inner end to a circumferential slot and wherein said coupler includes a radially projecting pin at each end thereof, each said pin of said coupler adapted to be received in a slot of a housing when the connector body secured to said housing is received in said coupler.

12. The connection of claim 9, wherein said holding means of said coupler includes a longitudinally extending slot at each end thereof with the slots being aligned longitudinally.

13. The connection of claim 12, wherein each of said connector bodies includes a radially projecting pin and the predetermined orientation is the alignment of the pin of each connector body with the radially extending line along which the centroid of the passageway of the plug assembled therewith is disposed, said pin of each said connector body being received in a slot of said coupler when said connector body is received in said coupler.

14. A method of providing a first plug and a second plug each having a passageway extending longitudinally therethrough and being adapted to receive an optical fiber, the plugs adapted to be connected together with the passageways aligned in a predetermined manner, said method including the steps of:

locating a longitudinal axis of the first plug and a longitudinal axis of the second plug; and determining for each plug a reference point disposed along a line which extends radially from the longitudinal axis of the plug through the centroid of an opening to the passageway in an end face of the plug to cause the plugs to be adapted to be supported with the longitudinal axes thereof being coaxial and with the refernce points of the plugs being disposed in a common plane which originates at and extends radially from the longitudinal axes to cause the centroids of the passageways to be disposed substantially in the common plane.

15. The method of claim 14, wherein the reference point for each plug is a marking which is made on a surface of the plug.

16. The method of claim 14, wherein each plug has a cylindrical cross-section and is assembled to a cylindrical connector body having a pin extending in a radial direction from the longitudinal axis of the plug assembled therewith, the plug being assembled with the connector body to cause the pin of the connector body to be aligned with the radially extending line of the plug.

17. The method of claim 16, wherein the angle between a reference axis and the radially extending line through the reference point for each plug is determined and wherein a connector body is assembled to each plug with the pin of the connector body displaced by the same angle from the reference axis.

18. The method of claim 16, wherein each connector body is secured within a housing which is adapted to be connected to a coupler in which is received the plug.

19. The method of claim 18, wherein the coupler includes a sleeve adapted at each end to receive a plug, the plugs adapted to be supported in the sleeve with their end faces in a predetermined spatial relation to each other, and the pins of the connector bodies being received in aligned slots at ends of the coupler when the plugs are received in the sleeve to cause the pins and the centroids of the passageways to be disposed in the common plane.

20. A method of providing first and second plugs each having a passageway extending longitudinally therethrough and being adapted to receive an optical fiber, the plugs adapted to be connected together with the passageways aligned in a predetermined manner, said method including the steps of:

(a) locating the centroid of an opening of a passageway of a first plug in a plane which is transverse to a longitudinal axis of the first plug, the passageway adapted to receive an optical fiber;

(b) causing the first plug to be rotated about its longitudinal axis through an angle of 180°;
(c) locating the centroid of the opening of the passageway in the plane after the plug has been rotated 180°;
(d) locating the longitudinal axis of the first plug;
(e) locating the intersection of a line, which extends radially from the longitudinal axis of the first plug and which intersects the centroid of the rotated position of the passageway of the first plug, and the periphery of the first plug such that the centroid of the passageway of the first plug in the rotated position is disposed between the intersection and the longitudinal axis of the first plug;
(f) assembling the first plug with a connector body such that the intersection is aligned with a pin extending radially from the connector body;
(g) locating an intersection of a radially extending line and the periphery of a second plug in accordance with the steps set forth in (a)-(e); and
(h) assembling the second plug with a connector body such that the peripheral intersection is aligned with a pin extending radially from the connector body, the connector bodies being adapted to be mounted in a coupler with the plugs being received in a sleeve such that the pins of the connector bodies are aligned radially and the longitudinal axes of the plugs are coaxial to cause centroids of the openings to the passageways in the first and second plugs to be disposed substantially along a common plane which originates at the longitudinal axes of the plugs and which extends radially through the pins.

21. A method of connecting two optical fibers, said method including the steps of:
locating a longitudinal axis of a first plug and a longitudinal axis of a second plug each of said plugs including a longitudinally extending passageway adapted to receive an end portion of an optical fiber;
determining for each plug a radial line which extends from the longitudinal axis of the plug through the centroid of an opening of the passageway in an end face of the plug;
inserting an end portion of one optical fiber in the passageway of the first plug and an end portion of another optical fiber in the passageway of the second plug; and
supporting the first and second plugs with the longitudinal axes of the plugs being coaxial and with the radial lines of the plugs being disposed in a common plane which originates at and extends radially from the longitudinal axes to cause the centroids of the passageways to be disposed substantially in the common plane.

22. The method of claim 21, wherein each plug has a cylindrical cross-section and is assembled to a cylindrical connector body having a pin extending in a radial direction from the longitudinal axis of the plug assembled therewith, the plug being assembled with the connector body to cause the pin of the connector body to be aligned with the radial line of the plug.

23. The method of claim 22, wherein each connector body is secured within a housing which is adapted to be connected to a coupler in which is received the plug, and the connector bodies are mounted in said coupler in a position fixed with respect to said coupler.

24. The method of claim 23, wherein the coupler includes a sleeve adapted at each end to receive a plug and the method includes the step of inserting the plugs into the sleeve until their end faces are in a predetermined spatial relation to each other, the pins of the connector bodies being received in aligned slots at ends of the coupler to cause the pins and the passageways to be disposed in the common plane.

25. A method of connecting two optical fibers, said method including the steps of:
(a) locating the centroid of an opening of a passageway of a first plug in a plane which is transverse to a longitudinal axis of the first plug, the passageway adapted to receive an optical fiber;
(b) causing the first plug to be rotated about its longitudinal axis through an angle of 180°;
(c) locating the centroid of the opening of the passageway in the plane after the first plug has been rotated 180°;
(d) locating the longitudinal axis of the first plug;
(e) locating the intersection of a line which extends radially from the longitudinal axis of the first plug and the periphery of the first plug and which intersects the location of the centroid of the rotated position of the passageway of the first plug such that the passageway in the rotated position of the first plug is disposed between the intersection and the longitudinal axis of the first plug;
(f) assembling the first plug with a connector body such that the intersection is aligned with a pin extending from the connector body;
(g) inserting an end portion of an optical fiber in the passageway of the first plug;
(h) locating an intersection of a radially extending line and the periphery of a second plug accordance with the steps set forth in (a)-(e);
(i) assembling the second plug with a connector body such that the peripheral intersection is aligned with a pin extending from the connector body;
(j) inserting an end portion of an optical fiber in the passageway of the second plug; and
(k) mounting each of the connector bodies in a coupler with the plugs being received in a sleeve such that the pins of the connector bodies are aligned and the longitudinal axes of the plugs are coaxial to cause centroids of the openings to the passageways in the first and second plugs to be disposed substantially in a common plane which originates at the longitudinal axes of the plugs and which extends radially through the pins.

26. The method of claim 25, wherein an end face of each optical fiber as mounted in a plug is coplanar with the plane to which the passageway opens.

27. The method of claim 25, wherein each connector body is received in a housing and wherein the step of inserting an optical fiber into the passageway of each plug is accomplished subsequent to the assembly of the connector body with a housing.

* * * * *